(12) United States Patent
Enda et al.

(10) Patent No.: US 11,766,690 B2
(45) Date of Patent: Sep. 26, 2023

(54) DEVICE FOR COATING CYLINDER INCLUDING A COATING HEAD WITH COATING GUNS

(71) Applicant: IHI Corporation, Koto-ku (JP)

(72) Inventors: Michiko Enda, Tokyo (JP); Takafumi Fujita, Tokyo (JP); Yuuichi Miura, Tokyo (JP); Miki Shinagawa, Tokyo (JP)

(73) Assignee: IHI Corporation, Koto-ku (JP)

( * ) Notice: Subject to any disclaimer, the term of this patent is extended or adjusted under 35 U.S.C. 154(b) by 800 days.

(21) Appl. No.: 16/777,952

(22) Filed: Jan. 31, 2020

(65) Prior Publication Data

US 2020/0164396 A1 May 28, 2020

Related U.S. Application Data

(63) Continuation of application No. PCT/JP2018/030274, filed on Aug. 14, 2018.

(30) Foreign Application Priority Data

Sep. 7, 2017 (JP) .................................. 2017-171966

(51) Int. Cl.
*B05B 11/00* (2023.01)
*B05B 14/30* (2018.01)
(Continued)

(52) U.S. Cl.
CPC ........ *B05B 13/0636* (2013.01); *B05B 7/0807* (2013.01); *B05B 7/2486* (2013.01);
(Continued)

(58) Field of Classification Search
CPC ..... B05B 12/1481; B05B 12/16; B05B 12/20; B05B 12/22; B05B 12/32; B05B 12/34;
(Continued)

(56) References Cited

U.S. PATENT DOCUMENTS 2,619,430 A * 11/1952 Fink ........................ C03C 17/10
427/232
3,155,539 A 11/1964 Juvinall
(Continued)

FOREIGN PATENT DOCUMENTS

CN 1060045 A 4/1992
CN 201880667 U 6/2011
(Continued)

*Primary Examiner* — Karl Kurple
(74) *Attorney, Agent, or Firm* — Oblon, McClelland, Maier & Neustadt, L.L.P.

(57) ABSTRACT

A device for coating a cylinder includes a coating head capable of being inserted into the cylinder, a plurality of coating guns which are provided on the coating head and are configured to discharge a coating material in a direction intersecting a longitudinal direction of the coating head, and a rotating cover which, when the coating material is discharged from one of a first coating gun and a second coating gun among the plurality of coating guns, is configured to cover the other of the first coating gun and the second coating gun, in which the plurality of coating guns are connected to coating material supply devices of different systems, respectively.

5 Claims, 7 Drawing Sheets

(51) Int. Cl.
    *B05B 12/04*     (2006.01)
    *B05C 7/08*     (2006.01)
    *B05B 13/06*     (2006.01)
    *B05B 7/08*     (2006.01)
    *B05B 7/26*     (2006.01)
    *B05B 7/24*     (2006.01)
    *B05D 7/22*     (2006.01)
    *F16L 101/16*     (2006.01)

(52) U.S. Cl.
    CPC .............. *B05B 7/2489* (2013.01); *B05B 7/26* (2013.01); *B05B 11/0032* (2013.01); *B05B 12/04* (2013.01); *B05B 13/0627* (2013.01); *B05B 14/30* (2018.02); *B05C 7/08* (2013.01); *B05B 13/0618* (2013.01); *B05D 7/22* (2013.01); *B05D 7/222* (2013.01); *B05D 7/225* (2013.01); *B05D 2254/04* (2013.01); *F16L 2101/16* (2013.01); *Y10S 118/10* (2013.01)

(58) Field of Classification Search
    CPC ..... B05B 12/36; B05B 11/0032; B05B 14/30; B05B 12/04
    See application file for complete search history.

(56) References Cited

U.S. PATENT DOCUMENTS

| | | | | |
|---|---|---|---|---|
| 3,362,325 | A * | 1/1968 | Foster | G03G 15/321 347/120 |
| 3,797,456 | A * | 3/1974 | Hogstrom | B05B 1/04 118/316 |
| 3,815,145 | A * | 6/1974 | Tisch | G03G 15/323 347/123 |
| 4,041,898 | A * | 8/1977 | Tajima | B05B 12/22 118/301 |
| 4,169,906 | A * | 10/1979 | Hallstrom | F16L 57/06 138/DIG. 6 |
| 4,340,010 | A * | 7/1982 | Hart | B05B 13/06 118/308 |
| 4,378,386 | A * | 3/1983 | Rehman | B05D 1/02 427/233 |
| 4,877,645 | A * | 10/1989 | Bleich | B05B 13/0207 118/314 |
| 4,974,532 | A * | 12/1990 | March | B05B 12/22 118/301 |
| 5,175,018 | A * | 12/1992 | Lee | B05B 13/0431 118/301 |
| 5,686,989 | A * | 11/1997 | Hoffman | G01N 15/0255 356/336 |
| 6,368,666 | B1 * | 4/2002 | Bernert | B05B 12/20 118/301 |
| 6,451,117 | B1 * | 9/2002 | Farquhar | B05D 1/32 118/504 |
| 10,421,092 | B2 * | 9/2019 | Rouaud | B05D 1/36 |
| 2001/0036512 | A1 * | 11/2001 | Ito | B05C 11/10 427/256 |
| 2003/0152699 | A1 * | 8/2003 | Someno | C23C 4/16 427/236 |
| 2008/0094428 | A1 * | 4/2008 | Otis | B41J 2/17513 347/1 |
| 2008/0233293 | A1 * | 9/2008 | Borgne | B05D 1/02 118/323 |
| 2010/0065662 | A1 * | 3/2010 | Kodama | C23C 4/16 239/437 |
| 2010/0189895 | A1 * | 7/2010 | Arndt | F16L 58/14 165/61 |
| 2012/0177809 | A1 * | 7/2012 | Solie | F16L 58/1027 118/713 |
| 2013/0216716 | A1 | 8/2013 | Ströhlein et al. | |
| 2014/0251206 | A1 * | 9/2014 | Kim | B05B 3/02 118/306 |
| 2015/0182987 | A1 * | 7/2015 | Schillinger | B05B 13/0207 118/301 |
| 2015/0182993 | A1 * | 7/2015 | Binner | B41F 15/40 118/301 |
| 2016/0096188 | A1 * | 4/2016 | Tanner | B05D 7/222 427/230 |
| 2016/0122856 | A1 * | 5/2016 | Wipf | B05B 13/0636 427/130 |
| 2017/0203339 | A1 * | 7/2017 | Haremaki | B08B 17/00 |
| 2017/0209878 | A1 * | 7/2017 | Otani | B05B 3/027 |
| 2017/0239770 | A1 * | 8/2017 | Tachiki | B23Q 16/105 |
| 2018/0010905 | A1 * | 1/2018 | Wimmer | B05D 1/02 |
| 2021/0402428 | A1 * | 12/2021 | Cole | C09D 133/08 |

FOREIGN PATENT DOCUMENTS

| | | |
|---|---|---|
| CN | 202343374 U | 7/2012 |
| CN | 202778857 U | 3/2013 |
| CN | 103316817 A | 9/2013 |
| CN | 204801822 U | 11/2015 |
| JP | 60-183069 U | 12/1985 |
| JP | 61-278380 A | 12/1986 |
| JP | 63-94561 U | 6/1988 |
| JP | 5-155200 A | 6/1993 |
| JP | 6-114322 A | 4/1994 |
| JP | 6-206025 A | 7/1994 |
| JP | 10-393 A | 1/1998 |
| JP | 10-216576 A | 8/1998 |
| JP | 2003-251234 A | 9/2003 |
| JP | 2009-226346 A | 10/2009 |
| JP | 2009-255079 A | 11/2009 |
| JP | 2009-262094 A | 11/2009 |
| JP | 2009-291738 A | 12/2009 |
| JP | 2009-297630 A | 12/2009 |
| JP | 2010-5505 A | 1/2010 |
| JP | 2010-5575 A | 1/2010 |
| JP | 2010-17624 A | 1/2010 |
| JP | 2011-25151 A | 2/2011 |
| JP | 2012-223724 A | 11/2012 |

\* cited by examiner

DEVICE FOR COATING CYLINDER INCLUDING A COATING HEAD WITH COATING GUNS

CROSS-REFERENCE TO RELATED APPLICATIONS

This application is a Continuation Application based on International Application No. PCT/JP2018/030274, filed Aug. 14, 2018, which claims priority on Japanese Patent Application No. 2017-171966, filed Sep. 7, 2017, the contents of which are incorporated herein by reference.

TECHNICAL FIELD

The present disclosure relates to a device for coating a cylinder.

BACKGROUND

Patent Document 1 described below discloses a device for coating a cylinder that forms a coating film on an inner surface of an elongated cylinder as in a jet engine shaft. The device for coating a cylinder has a support base which horizontally supports the cylinder and is rotationally driven about an axis of the cylinder, and a coating machine which is configured to spray a coating material to a surface of the cylinder while moving a spray gun, which is provided at an interval from the surface of the cylinder supported by the support base, to be parallel to the axis of the cylinder, and the device forms a coating film on the inner surface from one end to the other end of the cylinder.

DOCUMENT OF RELATED ART

Patent Document

[Patent Document 1] Japanese Unexamined Patent Application, First Publication No. 2010-5505

SUMMARY

Depending on cylinders, in some cases, a plurality of types of coating films are formed in an overlapped manner by forming another coating film having a different function or a top coating film on a formed coating film. In such a case, in related art, the spray gun of the coating machine is cleaned and disassembled, a coating material supply tube is replaced to replace coating material, and then the spray gun is reassembled. Thus, the preparation thereof takes much longer than the coating time. On the other hand, when a dedicated coating machine is prepared for each coating material, it is necessary to prepare a plurality of coating machines depending on the type of coating material and the type of cylinder, and there is a large amount of capital investment.

The present disclosure has been made in view of the aforementioned problems, and an object thereof is to provide a device for coating a cylinder which has high productivity and is capable of reducing the time required for replacing a coating material and capable of forming a plurality of types of coating films.

A device for coating a cylinder of an aspect of the present disclosure has a coating head capable of being inserted into the cylinder; a plurality of coating guns which are provided on the coating head and are configured to discharge a coating material in a direction intersecting a longitudinal direction of the coating head; and a rotating cover which, when the coating material is discharged from one of a first coating gun and a second coating gun among the plurality of coating guns, is configured to cover the other of the first coating gun and the second coating gun, in which the plurality of coating guns are connected to coating material supply devices of different systems, respectively.

Further, in the device for coating a cylinder according to the above aspect, the first coating gun and the second coating gun may be provided at different positions from each other in the longitudinal direction of the coating head.

Further, in the device for coating a cylinder according to the above aspect, the coating material supply device may have a coating material supply tube and an air supply tube connected to the coating gun, and the coating material supply tube may be disposed to pass nearer to a central axis of the coating head than the air supply tube.

Further, in the device for coating a cylinder according to the above aspect, the coating material supply tube and the air supply tube may be disposed to avoid a discharge area of the coating gun.

Further, in the device for coating a cylinder according to the above aspect, the coating head may have a support plate portion which supports the coating gun, and the support plate portion may have a chamfered portion which is configured to retract from the discharge area of the coating gun.

Further, the device for coating a cylinder according to the above aspect may further have a plunger which is configured to suppress rotation of the rotating cover.

According to the present disclosure, it is possible to obtain a device for coating a cylinder which has high productivity and is capable of reducing the time required for replacing a coating material and capable of forming a plurality of types of coating films.

DESCRIPTION OF EMBODIMENTS

Hereinafter, a device for coating a cylinder according to an embodiment of the present disclosure will be described with reference to the drawings.

Figure 1:
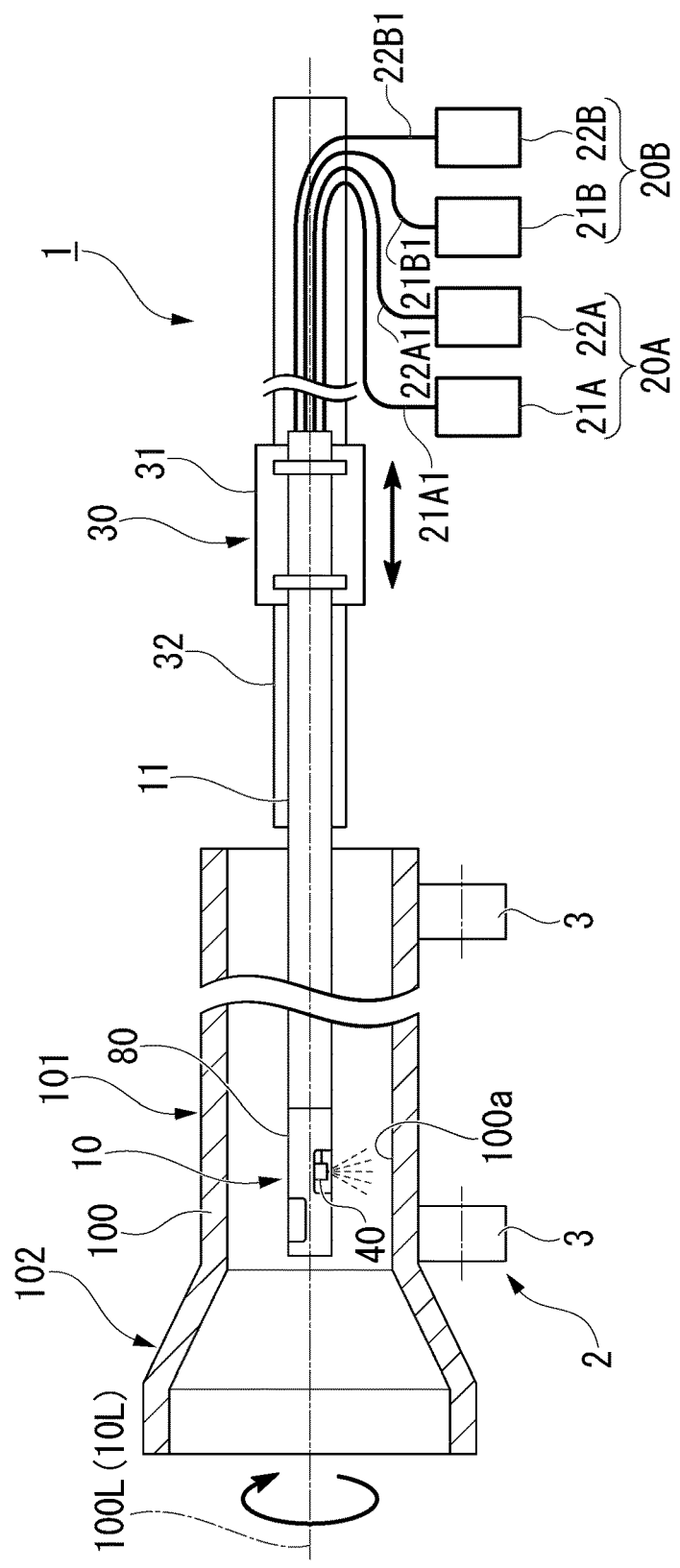
FIG. 1 is an overall configuration view of a device for coating a cylinder according to an embodiment of the present disclosure.

FIG. 1 is an entire configuration diagram of a device 1 for coating a cylinder according to an embodiment of the present disclosure.

The device 1 for coating a cylinder forms a coating film on an inner surface 100a of a cylinder 100, as shown in FIG. 1. The cylinder 100 of the present embodiment is, for example, a jet engine shaft having a straight pipe portion 101 and an enlarged diameter portion 102 as in the above-described Patent Document 1. The cylinder 100 is an elongated cylinder with a length of several meters, and meanwhile, an inner diameter of the straight pipe portion 101 is about several tens of centimeters.

The device 1 for coating a cylinder has a support base 2 which horizontally supports the cylinder 100, a coating head 10 which performs coating of the inner surface 100*a* of the cylinder 100, coating material supply devices 20A and 20B which supply coating material to the coating head 10, and a moving device 30 which moves the coating head 10 to be insertable into and removable from the inside of the cylinder 100.

The support base 2 has a plurality of rollers 3 which support the cylinder 100. The plurality of rollers 3 are provided at intervals in a front-rear direction of the cylinder 100. Further, the rollers 3 are provided in a pair in a left-right direction (a paper-depth direction in FIG. 1) across an axis 100L of the cylinder 100. The rollers 3 rotate the cylinder 100 around the axis 100L by being rotationally driven around a rotation axis extending in parallel with the axis 100L.

The coating head 10 has a cylindrical shape having an outer diameter with which it can be inserted into the cylinder 100 along the axis 100L. The coating head 10 is provided with a coating gun 40 that discharges the coating material in a direction intersecting a longitudinal direction in which a central axis 101, of the coating head 10 extends. The coating gun 40 of the present embodiment discharges the coating material downward in a vertical direction orthogonal to the longitudinal direction of the coating head 10. Note that the discharge direction of the coating material of the coating gun 40 is not limited to the vertical direction, and as long as the discharge direction is a direction intersecting the longitudinal direction of the coating head 10, it may be an oblique direction such as 45° or 60° when a horizontal plane is set as 0°.

The coating head 10 is supported by the moving device 30 via an arm 11. The arm 11 has a cylindrical shape that allows coating material supply tubes 21A1 and 21B1 and air supply tubes 22A1 and 22B1 of the coating material supply devices 20A and 20B to pass through the inside thereof. The arm 11 has a length substantially the same as an entire length of the cylinder 100. The coating head 10 is supported at a distal end portion of the arm 11, and a proximal end portion of the arm 11 is fixed to a moving carriage 31 of the moving device 30.

The moving carriage 31 moves along a guide rail 32 provided in parallel to the axis 100L of the cylinder 100. The guide rails 32 have substantially the same length as the entire length of the cylinder 100. The guide rail 32 is provided with a drive device that moves the moving carriage 31 via an endless chain (not shown). When the moving carriage 31 moves along the guide rails 32, the coating head 10 and the arm 11 are inserted into and removed from the inside of the cylinder 100.

Figure 2:
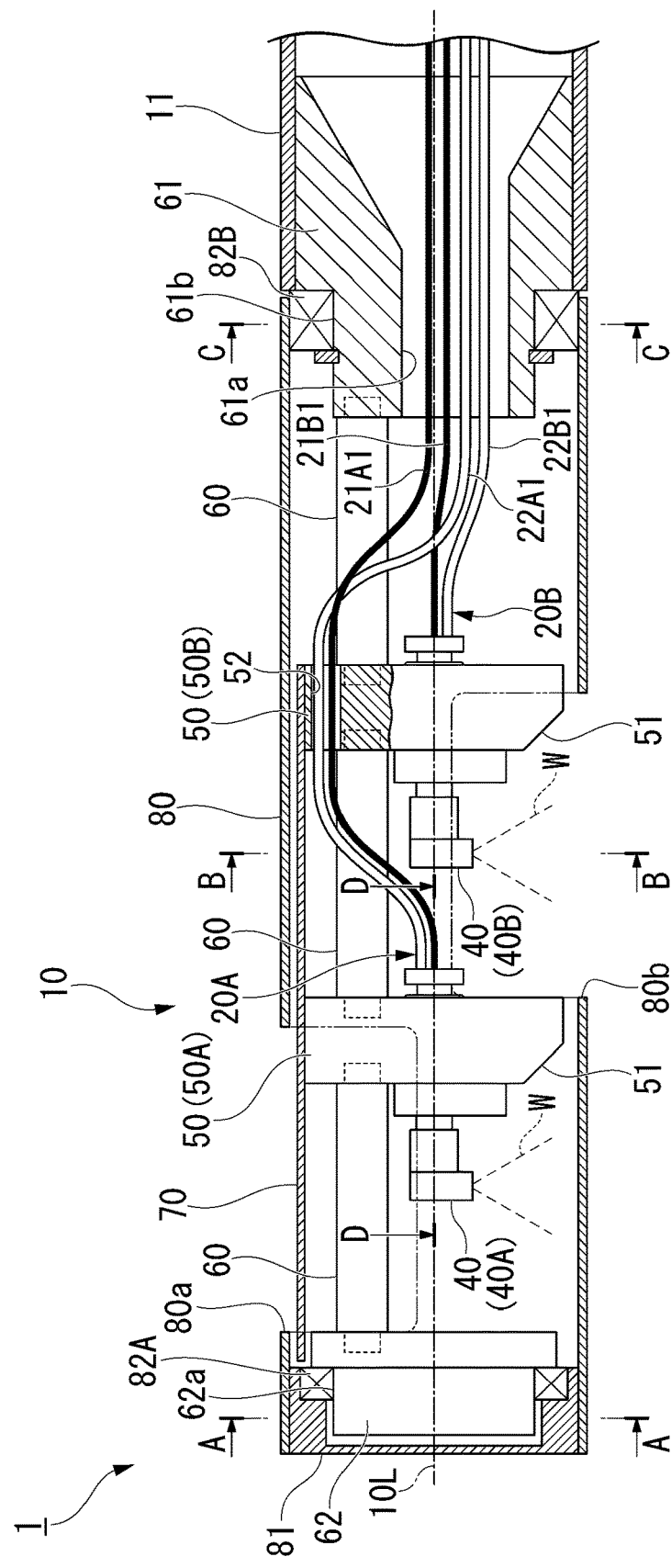
FIG. 2 is an internal configuration diagram of a coating head according to the embodiment of the present disclosure.
Figure 3:
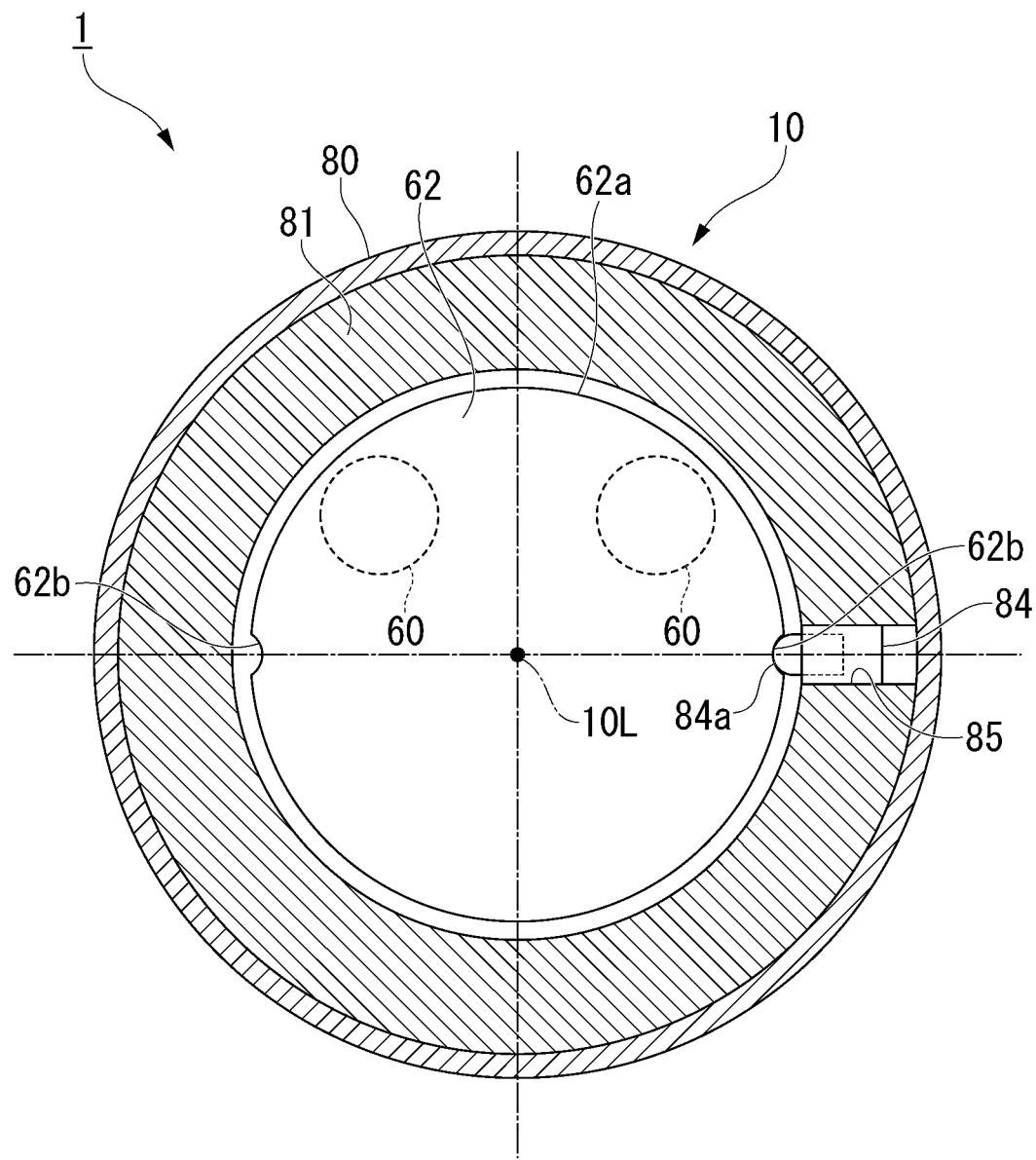
FIG. 3 is a cross-sectional view taken along a line A-A of FIG. 2.
Figure 4:
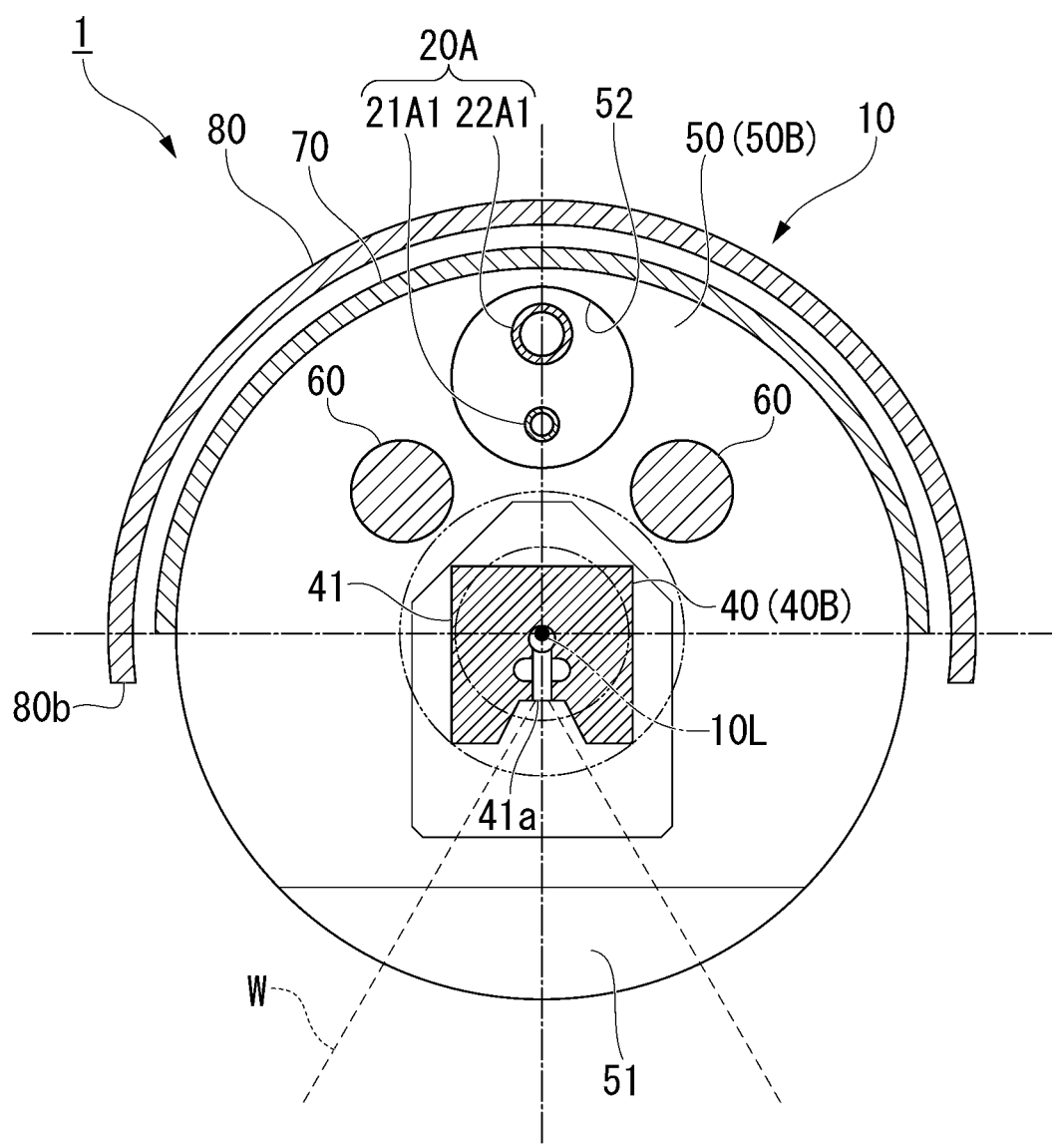
FIG. 4 is a cross-sectional view taken along a line B-B of FIG. 2.
Figure 5:
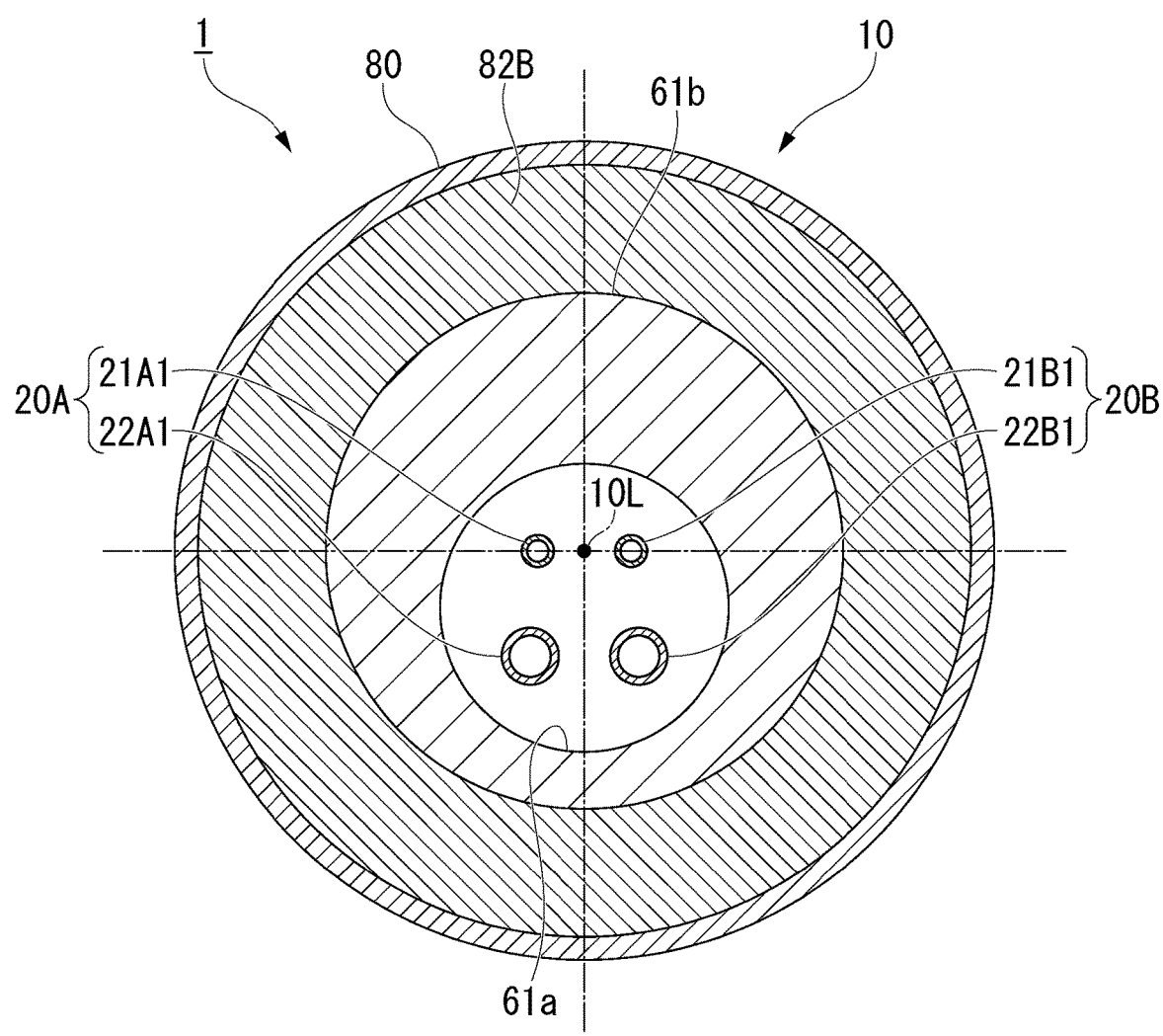
FIG. 5 is a cross-sectional view taken along a line C-C of FIG. 2.
Figure 6:
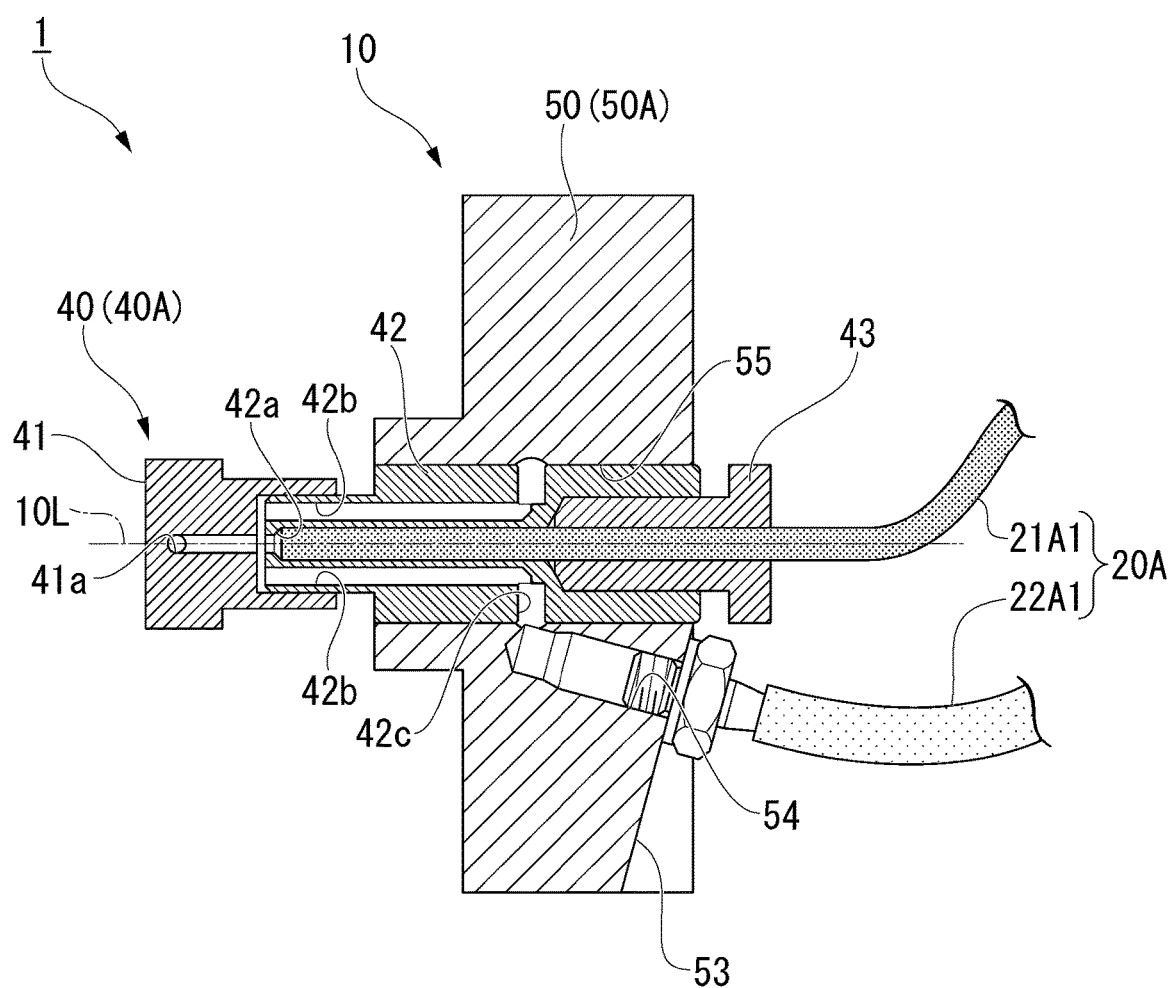
FIG. 6 is a cross-sectional view taken along a line D-D of FIG. 2.
Figure 7A:
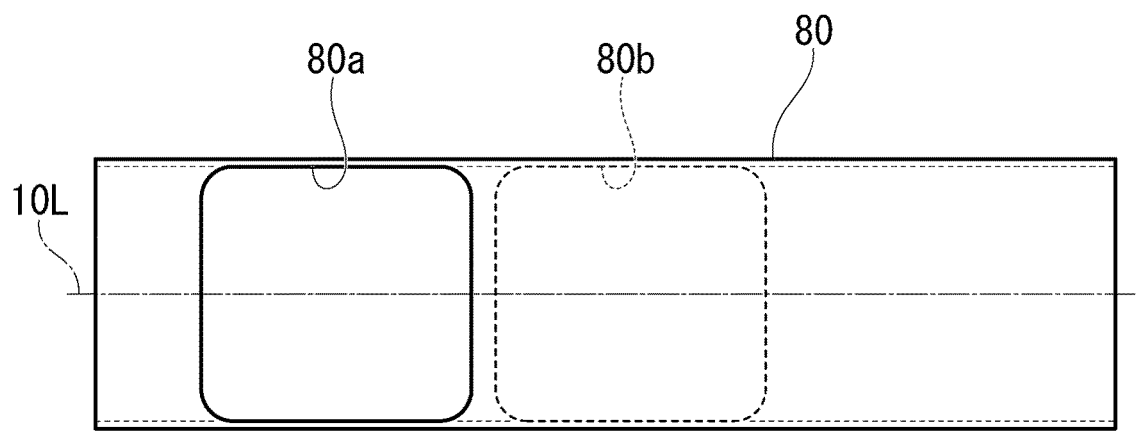
FIG. 7A is a plan view of a rotating cover provided on the coating head shown in FIG. 2.
Figure 7B:
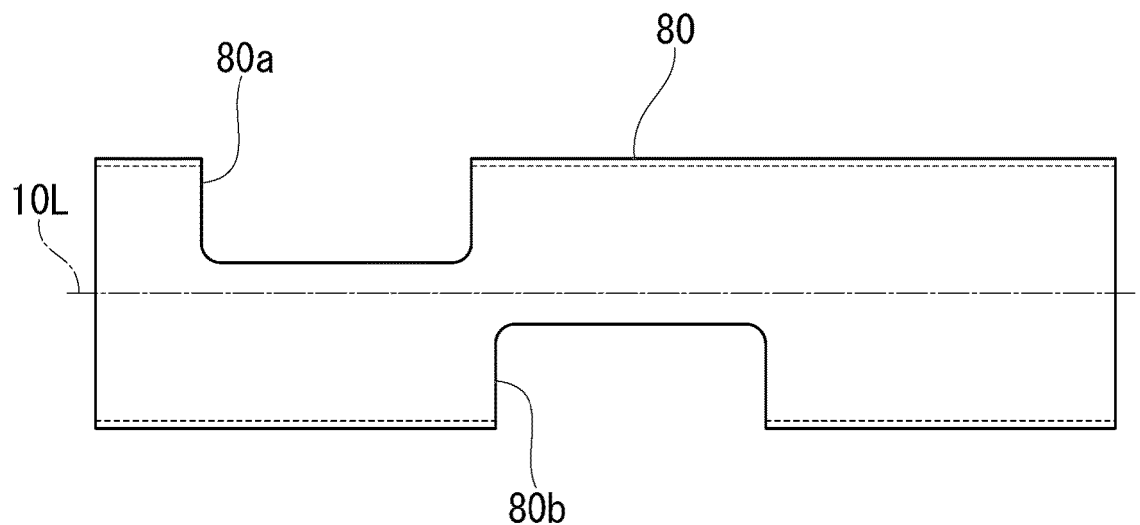
FIG. 7B is a side view of the rotating cover provided on the coating head shown in FIG. 2.

FIG. 2 is an internal configuration diagram of the coating head 10 in the embodiment of the present disclosure. FIG. 3 is a cross-sectional view taken along the line A-A in FIG. 2. FIG. 4 is a cross-sectional view taken along the line B-B in FIG. 2. FIG. 5 is a cross-sectional view taken along the line C-C in FIG. 2. FIG. 6 is a cross-sectional view taken along the line D-D in FIG. 2. FIG. 7A is a plan view of a rotating cover 80 provided on the coating head 10 shown in FIG. 2, and FIG. 7B is a side view of the rotating cover 80.

As shown in FIG. 2, the coating head 10 is provided with a plurality of coating guns 40. In the present embodiment, two coating guns 40 (a first coating gun 40A and a second coating gun 40B) are provided for forming two types of coating films on the inner surface 100*a* of the cylinder 100. Further, when three or more types of coating films are formed on the inner surface 100*a* of the cylinder 100, three or more coating guns 40 may be provided on the coating head 10.

The coating head 10 has a support plate portion 50 (a first support plate portion 50A and a second support plate portion 50B) which supports the coating gun 40. The support plate portion 50 has a chamfered portion 51 which retracts from a discharge area W of the coating gun 40. The chamfered portion 51 is notched at substantially the same angle as an injection angle of the coating material discharged from the coating gun 40. The support plate portion 50 supports the coating gun 40, as shown in FIG. 6. Although FIG. 6 shows a configuration of the first support plate portion 50A that supports the first coating gun 40A, the second support plate portion 50B that supports the second coating gun 40B also has the same configuration.

A mounting surface 53, on which the air supply tube 22A1 of the coating material supply device 20A is mounted, is formed on a back side of the first support plate portion 50A. The mounting surface 53 is a surface that obliquely intersects the central axis 10L, and a tube mounting hole 54 extending from the mounting surface 53 in an oblique direction with respect to the central axis 10L is formed. At the center of the first support plate portion 50A, a coating gun mounting hole 55 is formed to penetrate in a thickness direction of the first support plate portion 50A, and the tube mounting hole 54 communicates with an inner surface of the coating gun mounting hole 55.

The first coating gun 40A has a nozzle portion 41 which discharges the coating material, a flow path formation portion 42 which supplies the coating material and air to the nozzle portion 41, and a fixing portion 43 which fixes the coating material supply tube 21A1 of the coating material supply device 20A to the flow path formation portion 42. The nozzle portion 41 is provided with a discharge hole 41*a* that opens downward in the vertical direction. The flow path formation portion 42 is fitted to the inner surface of the coating gun mounting hole 55. A first flow path 42*a* through which the coating material flows and a second flow path 42*b* through which the air flows are formed inside the flow path formation portion 42.

The first flow path 42*a* extends along the central axis 10L of the coating head 10. The second flow path 42*b* is disposed around the first flow path 42*a* and extends in parallel with the first flow path 42*a*. The coating material supply tube 21A1 is inserted into the first flow path 42*a*, and a rear end of the first flow path 42*a* expands in diameter to such a size that the fixing portion 43 can be inserted. The fixing portion 43 fixes the coating material supply tube 21A1 to the flow path formation portion 42 by being fitted to the rear end of the first flow path 42*a*. Further, a connection flow path 42*c* that extends radially outward and is connected to the tube mounting hole 54 is formed in the second flow path 42*b*.

When the coating material is supplied to the first flow path 42*a* via the coating material supply tube 21A1 and the air is supplied to the second flow path 42*b* via the air supply tube 22A1, the coating material and the air are mixed, and then the coating material is discharged conically at a predetermined pressure from the discharge hole 41*a* of the nozzle portion 41.

As shown in FIG. 2, the first coating gun 40A of the above configuration is provided at a different position from the second coating gun 40B in the longitudinal direction of the coating head 10.

The first support plate portion 50A for supporting the first coating gun 40A and the second support plate portion 50B for supporting the second coating gun 40B are connected to each other by a connecting rod 60. Further, the second support plate portion 50B is connected to an arm distal end portion 61 via the connecting rod 60. Further, the first support plate portion 50A is connected to a head distal end portion 62 via the connecting rod 60. That is, the head distal end portion 62, the first support plate portion 50A, the second support plate portion 50B, and the arm distal end portion 61 are connected to one another at intervals in the longitudinal direction of the coating head 10.

The arm distal end portion 61 is a cylindrical body fitted to the end portion of the cylindrical arm 11. A penetration hole 61a penetrating along the central axis 10L is formed in the arm distal end portion 61. The penetration hole 61a is slightly eccentric to the discharge side of the coating gun 40 with respect to the central axis 10L to connect the connecting rod 60, which is disposed on a side opposite to the discharge side of the coating gun 40, to the arm distal end portion 61. The coating material supply tubes 21A1 and 21B1 and the air supply tubes 22A1 and 22B1 pass through the penetration hole 61a.

The coating material supply tube 21B1 and the air supply tube 22B1 are connected to the second coating gun 40B. In addition, the coating material supply tube 21A1 and the air supply tube 22A1 are connected to the first coating gun 40A through a penetration hole 52 formed in the second support plate portion 50B.

In this way, the first coating gun 40A and the second coating gun 40B are connected to different systems of the coating material supply devices 20A and 20B, respectively.

As shown in FIG. 1, the coating material supply device 20A includes a coating material supply source 21A including a tank, a pump and the like connected to the coating material supply tube 21A1, and an air supply source 22A including a tank, a pump and the like connected to the air supply tube 22A1. The coating material supply source 21A supplies, for example, a coating material containing aluminum powder to the first coating gun 40A via the coating material supply tube 21A1. The air supply source 22A supplies air of a predetermined pressure to the first coating gun 40A via the air supply tube 22A1.

The coating material supply device 20B includes a coating material supply source 21B including a tank, a pump and the like connected to the coating material supply tube 21B1, and an air supply source 22B including a tank, a pump and the like connected to the air supply tube 22B1. The coating material supply source 21B supplies, for example, a top coating material for forming a top coating film for preventing peeling on an aluminum-containing film formed by the first coating gun 40A, to the second coating gun 40B via the coating material supply tube 21B1. The air supply source 22B supplies air of a predetermined pressure to the second coating gun 40B via the air supply tube 22B1.

As shown in FIG. 2, the coating material supply tube 21A1 is disposed to pass nearer to the central axis 10L of the coating head 10 than the air supply tube 22A1. Further, the coating material supply tube 21B1 is disposed to pass nearer to the central axis 10L of the coating head 10 than the air supply tube 22B1. Specifically, as shown in FIG. 5, the coating material supply tube 21B1 passes, through the penetration hole 61a of the arm distal end portion 61, nearer to the central axis 10L of the coating head 10 than the air supply tube 22B1, and is connected to the second coating gun 40B not to bend further than the air supply tube 22B1 (see FIG. 2).

The coating material supply tube 21A1 passes, through the penetration hole 61a of the arm distal end portion 61, nearer to the central axis 10L of the coating head 10 than the air supply tube 22A1, as in the coating material supply tube 21B1 (see FIG. 5). Thereafter, as shown in FIG. 2, the coating material supply tube 21A1 and the air supply tube 22A1 pass through the penetration hole 52 of the second support plate portion 50B formed on the side opposite to the discharge side of the second coating gun 40B to avoid the discharge area W of the second coating gun 40B. As shown in FIG. 4, the coating material supply tube 21A1 also passes, through the penetration hole 52 of the second support plate portion 50B, nearer to the central axis 10L of the coating head 10 than the air supply tube 22A1, and is connected to the first coating gun 40A not to bend further than the air supply tube 22A1 (see FIG. 2).

As shown in FIG. 5, in the penetration hole 61a of the arm distal end portion 61, the positions in the vertical direction of the coating material supply tubes 21A1 and 21B1 are substantially the same as the position of the central axis 10L in the vertical direction.

As shown in FIG. 2, the coating head 10 is provided with a fixing cover 70 and a rotating cover 80. The fixing cover 70 is formed in a semicircular shape that covers the side opposite to the discharge sides of the first coating gun 40A and the second coating gun 40B, and is fixed to the support plate portion 50 via a mounting bolt (not shown). The rotating cover 80 is provided to be relatively rotatable with respect to the fixing cover 70, and as shown in FIG. 2, when the coating material is sprayed from one of the first coating gun 40A and the second coating gun 40B, the rotating cover 80 covers the other thereof.

As shown in FIGS. 7A and 7B, the rotating cover 80 has a first opening 80a and a second opening 80b formed at different positions from each other in the longitudinal direction in which the central axis 10L of the coating head 10 extends. The first opening 80a is provided at a position at which it can face the first coating gun 40A in the longitudinal direction of the coating head 10. Further, the second opening 80b is provided at a position at which it can face the second coating gun 40B in the longitudinal direction of the coating head 10. The first opening 80a and the second opening 80b open in directions opposite to each other (directions that differ from each other by 180°) in a radial direction of the rotating cover 80.

As shown in FIG. 2, both end portions of the rotating cover 80 are supported by slide bearings 82A and 82B to be rotatable around the central axis 10L of the coating head 10. The slide bearing 82A is slidably engaged with a stepped portion 62a formed on an outer peripheral surface of the head distal end portion 62. The slide bearing 82A is fixed to a lid 81 that closes an opening end of the rotating cover 80. Further, the rotating cover 80 is fixed to the lid 81.

As shown in FIG. 2, the slide bearing 82B is slidably engaged with a stepped portion 61b formed on the outer peripheral surface of the arm distal end portion 61. The rotating cover 80 is fixed to the slide bearing 82B via a mounting bolt (not shown).

As shown in FIG. 3, the lid 81 is provided with a plunger 84 which suppresses the rotation of the rotating cover 80. The plunger 84 is fitted to a plunger mounting hole 85 formed in the lid 81, and presses a distal end portion 84a of the plunger 84 toward the outer peripheral surface of the head distal end portion 62 by a spring (not shown).

An engagement groove 62b, with which the distal end portion 84a of the plunger 84 is engaged, is formed on the outer peripheral surface of the head distal end portion 62.

The engagement groove 62b has an arc-shaped cross-sectional profile as shown in FIG. 3, and the distal end portion 84a of the plunger 84 having a rounded distal end is engaged with the engagement groove 62b to be releasable in the circumferential direction. A pair of engagement grooves 62b are formed on the outer peripheral surface of the head distal end portion 62 across the central axis 10L. When the plunger 84 is engaged with any one of the pair of engagement grooves 62b, one of the first coating gun 40A and the second coating gun 40B is covered by the rotating cover 80.

The device 1 for coating a cylinder of the aforementioned configuration has the coating head 10 which can be inserted into the inside of the cylinder 100, and the plurality of coating guns 40 provided on the coating head 10 and configured to discharge the coating material in a direction intersecting the longitudinal direction of the coating head 10, and the plurality of coating guns 40 are connected to the coating material supply devices 20A and 20B of different systems, respectively. Therefore, it is possible to discharge two types of coating material, without performing a coating material replacement work. Therefore, the coating time of the cylinder 100 is shortened than before, and a highly productive production line can be constructed.

Further, the first coating gun 40A and the second coating gun 40B are provided at positions different from each other in the longitudinal direction of the coating head 10, as shown in FIG. 2. According to this configuration, since the diameter of the coating head 10 can be reduced, even when the inner diameter of the cylinder 100 is small as in a jet engine shaft, a plurality of the coating guns 40 can be disposed inside the cylinder 100. Further, in the present embodiment, as shown in FIG. 1, since the coating material supply sources 21A and 21B and the air supply sources 22A and 22B are provided at a location away from the coating head 10, the diameter of the coating head 10 can be reduced.

As shown in FIG. 2, the coating material supply tube 21A1 (21B1) is disposed to pass nearer to the central axis 10L of the coating head 10 than the air supply tube 22A1 (22B1). According to this configuration, the coating material supply tube 21A1 (21B1) through which the coating material flows can be connected to the first coating gun 40A (the second coating gun 40B) not to bend further than the air supply tube 22A1 (22B1). Since the coating material containing aluminum powder and the top coating material have higher viscosity than that of air, it is possible to suppress an occurrence of clogging of the coating material by reducing the pressure loss due to the bending of the coating material supply tube 21A1 (21B1) in this way.

Further, as shown in FIG. 2, since the coating material supply tube 21A1 and the air supply tube 22A1 are disposed to avoid the discharge area W of the second coating gun 40B, they does not inhibit the injection of the coating material from the second coating gun 40B.

Furthermore, since the support plate portion 50 that supports the coating gun 40 has the chamfered portion 51 that retracts from the discharge area W of the coating gun 40, it is possible to suppress adhesion of the coating material to the support plate portion 50.

Further, in the present embodiment, there is provided with the rotating cover 80 which, when the coating material is discharged from one (the second coating gun 40B in the example of FIG. 2) of the first coating gun 40A and the second coating gun 40B, is configured to cover the other (the first coating gun 40A in the example of FIG. 2) of the first coating gun 40A and the second coating gun 40B. According to this configuration, for example, even if the coating material discharged from the second coating gun 40B spreads in a mist form inside the cylinder 100, it is possible to suppress the coating material from adhering to the discharge hole 41a (see FIG. 4) or the like of the first coating gun 40A.

Furthermore, in the present embodiment, as shown in FIG. 3, since the plunger 84 for suppressing the rotation of the rotating cover 80 is provided, for example, the rotating cover 80 cannot be rotated even by the vibration when discharging the coating material. Therefore, it is possible to more reliably suppress the coating material from adhering to the coating gun 40 which does not discharge the coating material. When the coating material is switched, the coating head 10 is extracted from the inside of the cylinder 100 and the rotating cover 80 is rotated in the circumferential direction, thereby the engagement between the plunger 84 and the engagement groove 62b is released and the rotating cover 80 is rotated by 180 degrees.

As described above, according to the above-described present embodiment, it is possible to obtain the device 1 for coating a cylinder which has high productivity and is capable of reducing the time required for replacing the coating material and capable of forming a plurality of types of coating films in a short time.

Although the preferred embodiments of the present disclosure have been described above with reference to the drawings, the present disclosure is not limited to the above-described embodiments. The shapes, combinations, and the like of the constituent members shown in the above-described embodiment are merely examples, and various changes based on design requirements and the like can be made without departing from the spirit of the present disclosure.

For example, in the above-described embodiment, although the embodiment in which the plurality of coating guns are provided at different positions in the longitudinal direction of the coating head has been described as an example, if the inner diameter of the cylinder is large, the plurality of coating guns may be provided at positions which overlap each other in the longitudinal direction of the coating head. Further, a plurality of coating guns may be provided at the same position in the longitudinal direction of the coating head to discharge the coating material in opposite directions.

According to the present disclosure, it is possible to obtain a device for coating a cylinder which has highly productivity and is capable of reducing the time required for replacing a coating material and capable of forming a plurality of types of coating films.

What is claimed is:

1. A device for coating a cylinder comprising:
    a coating head configured to be inserted into the cylinder; said coating head is provided with a fixing cover, a rotating cover, and a support plate;
    a plurality of coating guns which are provided on the coating head and are configured to discharge a coating material in a direction intersecting a longitudinal direction of the coating head, the plurality of coating guns including a first coating gun and a second coating gun provided at different positions from each other in the longitudinal direction of the coating head; and
    the rotating cover which includes a first opening and a second opening formed at different positions from each other in the longitudinal direction of the coating head, the first opening being provided at a position at which the first opening is configured to face the first coating gun in the longitudinal direction of the coating head, and the second opening being provided at a position at which the second opening is configured to face the second coating gun in the longitudinal direction of the coating head, and which, when the coating material is discharged from the first coating gun the first opening of the rotating cover is configured to face the first coating gun in the longitudinal direction of the coating head and the second opening is configured to face a direction opposite to the first opening in a radial direction of the rotating cover, said rotating cover is rotatable around a central axis of the coating head; said fixing cover is fixed to the support plate and said fixing cover is provided to be rotatable with respect to the rotating cover, said fixing cover is formed in a semi-circular shape that covers a side opposite to discharge sides of the first coating gun and the second coating gun, wherein the plurality of coating guns are connected to coating material supply devices of different systems, respectively.

2. The device for coating the cylinder according to claim 1, wherein each of the coating material supply devices has a coating material supply tube and an air supply tube connected to a corresponding one of the plurality of coating guns, and the coating material supply tube is disposed to pass nearer to the central axis of the coating head than the air supply tube.

3. The device for coating the cylinder according to claim 2, wherein the coating material supply tube and the air supply tube are disposed to avoid a discharge area of the corresponding one of the plurality of coating guns.

4. The device for coating the cylinder according to claim 1, wherein the support plate of the coating head has a first support plate portion which supports the first coating gun and a second support plate portion which supports the second coating gun, and the first support plate portion has a first chamfered portion which is configured to retract from the a discharge area of the first coating gun, and the second support plate portion has a second chamfered portion which is configured to retract from a discharge area of the second coating gun.

5. The device for coating the cylinder according to claim 1, further comprising:
   a plunger which is configured to suppress rotation of the rotating cover.

* * * * *